US008877865B2

(12) United States Patent
Isoyama et al.

(10) Patent No.: US 8,877,865 B2
(45) Date of Patent: Nov. 4, 2014

(54) RESIN COMPOSITION AND MULTILAYERED STRUCTURE

(75) Inventors: Kouta Isoyama, Okayama (JP); Tatsuya Oshita, Kurashiki (JP); Hidekazu Saitou, Kamisu (JP); Hiroyuki Ono, Kamisu (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 525 days.

(21) Appl. No.: 13/259,909

(22) PCT Filed: Mar. 29, 2010

(86) PCT No.: PCT/JP2010/055593
§ 371 (c)(1),
(2), (4) Date: Sep. 30, 2011

(87) PCT Pub. No.: WO2010/113888
PCT Pub. Date: Oct. 7, 2010

(65) Prior Publication Data
US 2012/0045653 A1 Feb. 23, 2012

(30) Foreign Application Priority Data
Mar. 30, 2009 (JP) ................. 2009-081102

(51) Int. Cl.
| B32B 27/40 | (2006.01) |
| C08L 75/06 | (2006.01) |
| C08L 75/08 | (2006.01) |
| C08L 29/02 | (2006.01) |
| C08G 18/66 | (2006.01) |
| B32B 27/08 | (2006.01) |
| C08G 18/08 | (2006.01) |
| B32B 27/30 | (2006.01) |
| C08L 23/08 | (2006.01) |

(52) U.S. Cl.
CPC ............... C08L 75/06 (2013.01); B32B 27/40 (2013.01); B32B 2250/05 (2013.01); B32B 2250/40 (2013.01); B32B 2270/00 (2013.01); B32B 2305/70 (2013.01); B32B 2250/24 (2013.01); C08G 18/664 (2013.01); B32B 27/08 (2013.01); B32B 2307/7244 (2013.01); B32B 2272/00 (2013.01); C08G 18/0895 (2013.01); B32B 2307/51 (2013.01); C08L 2205/03 (2013.01); B32B 27/306 (2013.01); C08L 23/0861 (2013.01)
USPC .......................... 525/58; 428/423.3; 521/40.5

(58) Field of Classification Search
CPC ...... C08L 75/06; C08L 75/08; C08L 23/0846
USPC .......................... 525/58; 428/423.3; 521/40.5
See application file for complete search history.

(56) References Cited

U.S. PATENT DOCUMENTS

| 5,028,648 | A | 7/1991 | Famili et al. |
| 5,780,573 | A * | 7/1998 | Iwata et al. ................. 528/272 |
| 5,912,193 | A * | 6/1999 | Iwata et al. ................. 442/102 |
| 6,197,915 | B1 * | 3/2001 | Yamana et al. ............... 528/76 |
| 6,203,868 | B1 * | 3/2001 | Bonk et al. ................. 428/35.4 |
| 6,294,602 | B1 | 9/2001 | Shimo et al. |
| 7,084,207 | B2 * | 8/2006 | Yamana et al. ............... 525/60 |
| 7,387,837 | B2 * | 6/2008 | Yamana et al. ............ 428/423.1 |
| 2003/0232933 | A1 | 12/2003 | Lagneaux et al. |
| 2006/0177669 | A1 * | 8/2006 | Yamana et al. ........... 428/423.1 |
| 2009/0256276 | A1 * | 10/2009 | Humphrey et al. ......... 264/45.4 |
| 2012/0045653 | A1 * | 2/2012 | Isoyama et al. ........... 428/423.3 |

FOREIGN PATENT DOCUMENTS

| JP | 56 127617 | 10/1981 |
| JP | 58 22163 | 2/1983 |
| JP | 58 141274 | 8/1983 |
| JP | 63 132980 | 6/1988 |
| JP | 2 14855 | 1/1990 |
| JP | 2 206634 | 8/1990 |
| JP | 2 258341 | 10/1990 |
| JP | 3 5143 | 1/1991 |
| JP | 4 023823 | 1/1992 |
| JP | 4 226557 | 8/1992 |
| JP | 7 195635 | 8/1995 |
| JP | 09 151316 | 6/1997 |
| JP | 11 140244 | 5/1999 |
| JP | 2000 248073 | 9/2000 |
| JP | 2005 534734 | 11/2005 |
| JP | 2007 204639 | 8/2007 |

OTHER PUBLICATIONS

International Search Report Issued Jun. 29, 2010 in PCT/JP10/055593 Filed Mar. 29, 2010.

* cited by examiner

*Primary Examiner* — Mike M Dollinger
(74) *Attorney, Agent, or Firm* — Oblon, Spivak, McClelland, Maier & Neustadt, L.L.P.

(57) ABSTRACT

A resin composition, contains: a thermoplastic polyurethane (A); a thermoplastic polyurethane (B); and an ethylene-vinyl alcohol copolymer (C), wherein an isocyanate group content (mole) in raw materials of the thermoplastic polyurethane (A) is greater than a hydroxyl group content (mole) therein, an isocyanate group content (mole) in raw materials of the thermoplastic polyurethane (B) is nearly equal to a hydroxyl group content (mole) therein, and the thermoplastic polyurethane (B) and the ethylene-vinyl alcohol copolymer (C) have a mass ratio (B/C) of from 70/30 to 99/1 and a content of the thermoplastic polyurethane (A), based on 100 parts by mass of a total of the thermoplastic polyurethane (B) and the ethylene-vinyl alcohol copolymer (C), is from 1 to 30 parts by mass. Thus, a resin composition is provided that contains thermoplastic polyurethanes and an ethylene-vinyl alcohol copolymer and is good in melt shapability.

20 Claims, No Drawings

RESIN COMPOSITION AND MULTILAYERED STRUCTURE

TECHNICAL FIELD

The present invention relates to a resin composition containing thermoplastic polyurethanes and an ethylene-vinyl alcohol copolymer. It also relates to a method of producing a resin composition thereof. Further, it relates to a multilayered structure including a layer of a resin composition thereof.

BACKGROUND ART

Thermoplastic polyurethanes (hereinafter, may be referred to as TPU) are used in a wide range of fields due to their excellent strength, flexibility, an elastic recovery property, abrasion resistance, and the like. For example, shaped articles, such as a film, a sheet, a belt, a hose, and a tube, produced by extrusion molding and shaped articles in a variety of shapes obtained by injection molding have increasing applications due to their excellent properties. However, since the gas barrier property of a TPU is not good in general, a multilayered structure including a TPU layer and a gas barrier resin layer is used for applications in which a gas barrier property is required. As this gas barrier resin layer, there is proposed to use an ethylene-vinyl alcohol copolymer (hereinafter, may be referred to as EVOH) (for example, Patent Documents 1 through 3).

When producing a multilayered structure having an EVOH layer and a TPU layer, it is inevitable to generate scraps, such as edges of a multilayered film produced by coextrusion molding, by-product trimmed chips when producing by coextrusion blow molding, and further a loss due to poor shaping. Accordingly, it is desired to try reusing them from the perspective of production cost reduction and resource saving. However, resin compositions obtained by melt kneading scraps of a multilayered structure having a TPU layer and an EVOH layer are often poor in shapability, which hinders reuse of scraps and there has been a demand for improvement on that point.

Reuse of scraps of a multilayered structure having an EVOH layer has been reviewed variously from before. For example, in Patent Documents 4 through 6, methods of reusing scraps of a multilayered structure having an EVOH layer and a hydrophobic resin layer, such as polyolefin, are described. However, a method of reusing scraps of a multilayered structure having an EVOH layer and a TPU layer is not described.

PRIOR ART DOCUMENTS

Patent Documents

Patent Document 1: JP 58-22163A
Patent Document 2: JP 2-258341A
Patent Document 3: JP 3-5143A
Patent Document 4: JP 7-195635A
Patent Document 5: JP 11-140244A
Patent Document 6: JP 2000-248073A

SUMMARY OF THE INVENTION

Problems to be Solved by the Invention

The present invention is made to solve the above mentioned problems, and it is an object thereof to provide a resin composition containing a TPU and an EVOH and having good melt shapability. It is also an object to provide a preferred method of producing a resin composition thereof. Further, it is an object to provide a multilayered structure including a layer of a resin composition thereof.

Means for Solving the Problems

The above mentioned problems are solved by providing a resin composition, comprising: a thermoplastic polyurethane (A); a thermoplastic polyurethane (B); and an ethylene-vinyl alcohol copolymer (C), wherein the thermoplastic polyurethane (A) is a thermoplastic polyurethane obtained by reacting a polyisocyanate, a high molecular weight polyol, and a chain extender and is a thermoplastic polyurethane in which the high molecular weight polyol includes polyester polyol or polyether polyol having a number average molecular weight of from 500 to 8000 and the chain extender includes a low molecular weight polyol having a molecular weight of 300 or less, and also which satisfies a following expression (1)

$$1.02 \leq PIa/(POHa+CLa) \leq 1.12 \quad (1)$$

PIa: content (mole) of isocyanate groups in the polyisocyanate,
POHa: content (mole) of hydroxyl groups in the high molecular weight polyol, and
CLa: content (mole) of hydroxyl groups in the chain extender, the thermoplastic polyurethane (B) is a thermoplastic polyurethane obtained by reacting a polyisocyanate, a high molecular weight polyol, and a chain extender and is a thermoplastic polyurethane in which the high molecular weight polyol includes polyester polyol or polyether polyol having a number average molecular weight of from 500 to 8000 and the chain extender includes a low molecular weight polyol having a molecular weight of 300 or less, and also which satisfies a following expression (2)

$$PIb/(POHb+CLb) < 1.02 \quad (2)$$

PIb: content (mole) of isocyanate groups in the polyisocyanate
POHb: content (mole) of hydroxyl groups in the high molecular weight polyol
CLb: content (mole) of hydroxyl groups in the chain extender, the ethylene-vinyl alcohol copolymer (C) is an ethylene-vinyl alcohol copolymer having an ethylene content of from 20 to 60 mol % and having a degree of saponification of 90 mol % or more, and the thermoplastic polyurethane (B) and the ethylene-vinyl alcohol copolymer (C) have a mass ratio (B/C) of from 70/30 to 99/1 and a content of the thermoplastic polyurethane (A), based on 100 parts by mass of a total of the thermoplastic polyurethane (B) and the ethylene-vinyl alcohol copolymer (C), is from 1 to 30 parts by mass. At this time, it is preferred that the thermoplastic polyurethane (B) has a JIS A hardness of from 80 to 95.

The above mentioned problems are also solved by providing a method of producing the above mentioned resin composition, comprising melt kneading by blending the thermoplastic polyurethane (A) with a scrap obtained from a multilayered structure including at least one layer of the thermoplastic polyurethane (B) and at least one layer of the ethylene-vinyl alcohol copolymer (C).

Further, the above mentioned problems are also solved by providing a multilayered structure, comprising: at least one layer of the above mentioned resin composition; at least one layer of the thermoplastic polyurethane (B); and at least one layer of the ethylene-vinyl alcohol copolymer (C).

Effects of the Invention

A resin composition of the present invention is good in melt shapability. The resin composition can be produced by melt kneading using a scrap obtained from a multilayered structure having TPU layers and an EVOH layer, so that it is preferred from the perspective of producing cost reduction and resource saving. In addition, a multilayered structure including a layer of a resin composition of the present invention has a good appearance.

MODE FOR CARRYING OUT THE INVENTION

A resin composition of the present invention contains a TPU (A), a TPU (B), and an EVOH (C).

The TPU (A) is a TPU obtained by reacting a polyisocyanate, a high molecular weight polyol, and a chain extender and is a TPU in which the high molecular weight polyol includes polyester polyol or polyether polyol having a number average molecular weight of from 500 to 8000 and the chain extender includes a low molecular weight polyol having a molecular weight of 300 or less, and also which satisfies a following expression (1)

$$1.02 \leq PIa/(POHa+CLa) \leq 1.12 \quad (1)$$

PIa: content (mole) of isocyanate groups in the polyisocyanate,

POHa: content (mole) of hydroxyl groups in the high molecular weight polyol, and CLa: content (mole) of hydroxyl groups in the chain extender.

The TPU (B) is a TPU obtained by reacting a polyisocyanate, a high molecular weight polyol, and a chain extender and is a TPU in which the high molecular weight polyol includes polyester polyol or polyether polyol having a number average molecular weight of from 500 to 8000 and the chain extender includes a low molecular weight polyol having a molecular weight of 300 or less, and also which satisfies a following expression (2)

$$PIb/(POHb+CLb)<1.02 \quad (2)$$

PIb: content (mole) of isocyanate groups in the polyisocyanate

POHb: content (mole) of hydroxyl groups in the high molecular weight polyol

CLb: content (mole) of hydroxyl groups in the chain extender.

As the polyisocyanates used for synthesizing the TPU (A) and the TPU (B), various polyisocyanates can be used that are generally used in producing a TPU. A diisocyanate is usually used as the polyisocyanates, while it is allowed to use a small amount of a compound having three or more isocyanate groups, such as a triisocyanate, in combination as long as not inversely affecting thermoplasticity. Such a diisocyanate may include, for example, aromatic diisocyanates, such as 4,4'-diphenylmethane diisocyanate, tolylene diisocyanate, phenylene diisocyanate, xylylene diisocyanate, 1,5-naphthylene diisocyanate, 3,3'-dichloro-4,4'-diphenylmethane diisocyanate, and toluylene diisocyanate; and aliphatic or alicyclic diisocyanates, such as hexamethylene diisocyanate, isophorone diisocyanate, 4,4'-dicyclohexylmethane diisocyanate, and hydrogenated xylylene diisocyanate. One type of these polyisocyanates may be used singly, or two or more types may also be used in combination. Among them, it is preferred to use 4,4'-diphenylmethane diisocyanate.

The high molecular weight polyols used for synthesizing the TPU (A) and the TPU (B) are polyester polyol or polyether polyol having a number average molecular weight of from 500 to 8000. One type of these high molecular weight polyols may be used singly, or two or more types may also be used as a mixture.

Among the high molecular weight polyols, it is preferred to use polyester polyol. Polyester polyol can be produced by, for example, a direct esterification or transesterification reaction of an ester forming derivative, such as a dicarboxylic acid, an ester thereof, or an anhydride thereof, and a low molecular weight polyol in accordance with a conventional method or by ring opening polymerization of lactone.

As the dicarboxylic acid constituting the polyester polyol, those generally used in production of polyester can be used, and specific examples thereof may include aliphatic dicarboxylic acids having a carbon number of from 4 to 12, such as succinic acid, glutaric acid, adipic acid, pimelic acid, suberic acid, azelaic acid, sebacic acid, dodecanedioic acid, methylsuccinic acid, 2-methylglutaric acid, 3-methylglutaric acid, trimethyl adipic acid, 2-methyloctanedioic acid, 3,8-dimethyldecanedioic acid, and 3,7-dimethyldecanedioic acid; alicyclic dicarboxylic acids, such as cyclohexanedicarboxylic acid; and aromatic dicarboxylic acids such as terephthalic acid, isophthalic acid, orthophthalic acid, and naphthalenedicarboxylic acid. One type of these dicarboxylic acids may be used singly, or two or more types may also be used two or more types as a mixture. Among them, it is preferred to use an aliphatic dicarboxylic acid having a carbon number of from 6 to 12, and more preferred to use adipic acid, azelaic acid, or sebacic acid.

As the low molecular weight polyol constituting the polyester polyol, diols generally used in production of polyester can be used. Specific examples thereof may include aliphatic diols having a carbon number of from 2 to 15, such as ethylene glycol, diethylene glycol, triethylene glycol, propylene glycol, 1,3-propanediol, 2-methyl-1,3-propanediol, 1,3-butylene glycol, 1,4-butanediol, 2-methyl-1,4-butanediol, neopentyl glycol, 1,5-pentanediol, 3-methyl-1,5-pentanediol, 1,6-hexanediol, 1,8-octanediol, 2-methyl-1,8-octanediol, 2,7-dimethyl-1,8-octanediol, 1,9-nonanediol, 2-methyl-1,9-nonanediol, 2,8-dimethyl-1,9-nonanediol, 1,10-decanediol, and 2,2-diethyl-1,3-propanediol; alicyclic diols, such as 1,4-cyclohexanediol, cyclohexanedimethanol, cyclooctanedimethanol, and dimethyl cyclooctanedimethanol; and aromatic dihydric alcohols, such as 1,4-bis(β-hydroxyethoxy)benzene. One type of these low molecular weight polyols may be used singly, or two or more types may also be used as a mixture. Among them, it is preferred to use an aliphatic diol having a carbon number of from 2 to 6, and it is more preferred to use 1,4-butanediol or 3-methyl-1,5-pentanediol. Further, together with the above mentioned diol(s), a small amount of a trifunctional or higher-functional low molecular weight polyol can be used in combination. Such a trifunctional or higher-functional low molecular weight polyol may include, for example, trimethylolpropane, trimethylolethane, glycerin, and 1,2,6-hexanetriol.

The lactone used in a case of producing the polyester polyol by ring opening polymerization of lactone may include ε-caprolactone and β-methyl-δ-valerolactone.

The polyether polyol may include, for example, polyethylene glycol, polypropylene glycol, polytetramethylene glycol, and poly(methyltetramethylene glycol). One type of these polyether polyols may be used singly, or two or more types may also be used as a mixture. Among them, it is preferred to use polytetramethylene glycol.

Since the high molecular weight polyols have a number average molecular weight within a range of from 500 to 8,000, TPUs are obtained that are more excellent in a mechanical performance and shapability. The number average molecular weight is preferably not less than 700 and not more than 5,000. Each of the number average molecular weights of a high molecular weight polyol in this context is a number average molecular weight calculated based on a hydroxyl number measured in accordance with JIS K1577.

The chain extenders used for synthesizing the TPU (A) and the TPU (B) are low molecular weight polyols having a molecular weight of 300 or less and are usually diols. For example, they may include ethylene glycol, propylene glycol, 1,4-butanediol, 1,6-hexanediol, 1,4-bis(β-hydroxyethoxy)benzene, 1,4-cyclohexanediol, bis(β-hydroxyethyl)terephthalate, and xylylene glycol. One type of these low molecular weight polyols may be used singly, or two or more types may also be used as a mixture. Among them, it is preferred to use an aliphatic diol having a carbon number of from 2 to 10, and more preferred to use 1,4-butanediol.

As a method of producing the TPU (A) and the TPU (B), it is possible to produce using the high molecular weight polyol, the polyisocyanate, and the chain extender mentioned above and utilizing a known urethanization reaction technique. At this time, it is possible to produce either by a prepolymer method or a one-shot method. Melt polymerization substantially in the absence of a solvent is preferred, and in particular, continuous melt polymerization using a multi-shaft screw extruder is preferred.

In the present invention, it is important that the TPU (A) satisfies the following expression (1)

$$1.02 \leq PIa/(POHa+CLa) \leq 1.12 \quad (1)$$

PIa: content (mole) of isocyanate groups in the polyisocyanate,
POHa: content (mole) of hydroxyl groups in the high molecular weight polyol, and
CLa: content (mole) of hydroxyl groups in the chain extender, and that the TPU (B) satisfies the following expression (2)

$$PIb/(POHb+CLb)<1.02 \quad (2)$$

PIb: content (mole) of isocyanate groups in the polyisocyanate
POHb: content (mole) of hydroxyl groups in the high molecular weight polyol
CLb: content (mole) of hydroxyl groups in the chain extender.

Although a ratio [PIa/(POHa+CLa)] in a general TPU used for melt molding is often less than 1.02 in usual cases, the melt shapability of a resin composition including such a TPU and an EVOH has not always been good. For example, in such a case of forming a film using the resin composition, holes, film surface roughness, and the like have been prone to be generated and shaped articles having a good appearance have not been easily obtained. This point has been a particular problem in such a case of melt molding by reusing scraps of a multilayered structure having a TPU layer and an EVOH layer. In this regard, the present inventors have found that the melt shapability of a resin composition containing an EVOH becomes good by using a TPU having a ratio [PIa/(POHa+CLa)] of 1.02 or more in addition to a TPU having a ratio [PIa/(POHa+CLa)] of less than 1.02 and thus have completed the present invention. Although the mechanism is not altogether clear, it is considered because a decrease in the molecular weight of the TPU derived from moisture absorption at the time of melt molding is effectively suppressed by blending the TPU having a high isocyanate ratio.

The TPU (A) satisfies the following expression (1)

$$1.02 \leq PIa/(POHa+CLa) \leq 1.12 \quad (1)$$

In a case that the ratio [PIa/(POHa+CLa)] is less than 1.02, even by adding the TPU (A) to a mixture including the TPU (B) and the EVOH (C), the effect of preventing the decrease in melt viscosity of the resin composition thus obtained is insufficient. The ratio [PIa/(POHa+CLa)] is preferably 1.03 or more, and more preferably 1.04 or more. In contrast, in a case that the ratio [PIa/(POHa+CLa)] exceeds 1.12, it becomes difficult to sufficiently increase the degree of polymerization of the TPU (A), so that it is difficult to synthesize a TPU (A) having a preferable logarithmic viscosity. The ratio [PIa/(POHa+CLa)] is preferably 1.10 or less, and more preferably 1.08 or less.

The TPU (B) satisfies the following expression (2)

$$PIb/(POHb+CLb)<1.02 \quad (2)$$

There is a possibility of degrading the long term operational stability in a case that the ratio [PIa/(POHa+CLa)] is 1.02 or more, in a case that the TPU (B) is obtained by extrusion molding, or in a case that a resin composition containing the TPU (B) is obtained by extrusion molding. The ratio [PIa/(POHa+CLa)] is preferably 1.01 or less. Usually, the ratio [PIa/(POHa+CLa)] is 0.98 or more and is preferably 0.99 or more.

The TPU (B) preferably has a JIS A hardness within a range of from 80 to 95. In a case that the JIS A hardness is lower than 80 or is higher than 95, the fatigue resistance, the flexibility, and the like of the multilayered structure having the TPU layers and the EVOH layer are degraded. A more preferable lower limit of the JIS A hardness is 85. Here, the JIS A hardness of a TPU is a value measured in accordance with JIS K7311. On the other hand, it is preferred that the TPU (A) also has a JIS A hardness comparable with that of the TPU (B).

The TPU (A) preferably has a logarithmic viscosity of 0.85 dl/g or more when measured at 30° C. using a solution obtained by dissolving the TPU (A) in N,N-dimethylformamide to be at a concentration of 0.5 g/dl, more preferably 1.0 dl/g or more, and even more preferably 1.1 dl/g or more. In a case of using a TPU (A) having a logarithmic viscosity lower than that mentioned above, there is a possibility of not applying a sufficient shear force when melt kneading the TPU (A), the TPU (B), and the EVOH (C) and of making the reaction of the isocyanate groups contained in the TPU (A) less developing. The TPU (A) usually has a logarithmic viscosity of 1.5 dl/g or less.

On the other hand, the TPU (B) preferably has a logarithmic viscosity of 0.85 dl/g or more when measured at 30° C. using a solution obtained by dissolving the TPU (B) in N,N-dimethylformamide to be at a concentration of 0.5 g/dl, more preferably 1.0 dl/g or more, and even more preferably 1.1 dl/g or more. By using the TPU (A) having the logarithmic viscosity mentioned above, shaped articles having less residual strain are obtained. The TPU (B) usually has a logarithmic viscosity of 1.2 dl/g or less.

The EVOH (C) used in the present invention is obtained by saponifying a copolymer of ethylene and a fatty acid vinyl ester, such as vinyl acetate, using an alkali catalyst or the like.

The ethylene content of the EVOH (C) is from 20 to 60 mol %. With the ethylene content of less than 20 mol %, the gas barrier property at high humidity decreases and the melt shapability is also degraded. The ethylene content is preferably 25 mol % or more. In contrast, with an ethylene content of over 60 mol %, a sufficient gas barrier property is not obtained. The ethylene content is preferably 50 mol % or less, and more preferably 45 mol % or less.

The EVOH (C) has a degree of saponification of 90 mol % or more, preferably 95 mol % or more, and more preferably 98 mol % or more. With a degree of saponification of less than 90 mol %, not only the gas barrier property at high humidity decreases but also the thermal stability of the EVOH (C) is degraded and gel and hard spots are prone to be generated in a shaped article thereof.

The ethylene content and the degree of saponification of the EVOH (C) can be obtained by a nuclear magnetic resonance (NMR) method.

In the EVOH (C), as long as the object of the present invention is not inhibited, a small amount of another monomer can also be copolymerized. Examples of the copolymerizable monomer may include α-olefins, such as propylene, 1-butene, isobutene, 4-methyl-1-pentene, 1-hexene, and 1-octene; unsaturated carboxylic acids, such as itaconic acid, methacrylic acid, acrylic acid, and maleic anhydride, a salt thereof, a partial or complete ester thereof, a nitrile thereof, an amide thereof, and an anhydride thereof; unsaturated sulfonic acids or a salt thereof; alkylthiols; and vinylpyrrolidones. The amount of copolymerization is usually 10 mol % or less and preferably 5 mol % or less.

The EVOH (C) may also contain from 0.0002 to 0.2 mol % of a vinylsilane compound as a copolymerization component. In this case, not only matching of the melt viscosity with the base resin during coextrusion is improved to enable production of a uniform coextrusion multilayered film but also the dispersibility in a case of blending it with another resin is sometimes improved. Accordingly, it is effective from the perspective of improving the melt shapability. Here, the vinylsilane compound may include, for example, vinyltrimethoxysilane, vinyltriethoxysilane, vinyltri(β-methoxyethoxy)silane, and γ-methacryloxypropylmethoxysilane. Among all, vinyltrimethoxysilane and vinyltriethoxysilane are used preferably.

The EVOH (C) may also contain a boron compound. In that case, sometimes, the melt viscosity is improved and the dispersibility when mixed with the TPU (A) and the TPU (B) is improved, and also it is enabled to shape a uniform coextrusion multilayered film. The boron compound content is preferably from 20 to 2000 ppm in terms of boron elements, and more preferably from 50 to 1000 ppm. Here, the boron compound may include boric acids, boric acid esters, borates, and boron hydrides. Specifically, the boric acids may include orthoboric acid, metaboric acid, and tetraboric acid, the boric acid esters may include triethyl borate and trimethyl borate, and the borates may include an alkali metal salt and an alkaline earth metal salt of the various boric acids mentioned above and borax. Among these compounds, orthoboric acid and $NaBH_4$ are preferred.

The EVOH (C) may also contain an alkali metal salt of from 5 to 5000 ppm in terms of alkali metal elements. In this case, the interlayer adhesion and the compatibility are sometimes improved. The alkali metal salt is more preferably contained from 20 to 1000 ppm in terms of alkali metal elements, and even more preferably from 30 to 500 ppm. Here, the alkali metal may include lithium, sodium, and potassium, and the alkali metal salt may include aliphatic carboxylates, aromatic carboxylates, phosphates, and metal complexes of monovalent metals. For example, it may include sodium acetate, potassium acetate, sodium phosphate, lithium phosphate, sodium stearate, potassium stearate, and a sodium salt of ethylenediaminetetraacetic acid. Among all, sodium acetate, potassium acetate, and sodium phosphate are preferred.

The EVOH (C) may also contain a phosphorus compound of from 2 to 200 ppm in terms of phosphorus elements, more preferably from 3 to 150 ppm, and optimally from 5 to 100 ppm. In a case that the phosphorus concentration in the EVOH (C) is less than 2 ppm or in a case that it is more than 200 ppm, there may be a case of causing a problem in the melt shapability and the thermal stability. In particular, problems are sometimes prone to be generated that generates gel-like hard spots and coloration while melt molding over a long period of time. The type of the phosphorus compound blended in the EVOH (C) is not limited in particular, and it is possible to use various acids, such as phosphoric acid and phosphorous acid, salts thereof, and the like. The phosphate may be contained in any form of a primary phosphate, a secondary phosphate, or a tertiary phosphate, and although the cationic species thereof is also not limited in particular, alkali metal salts and alkaline earth metal salts are preferred. Among all, it is preferred to add a phosphorus compound in a form of sodium dihydrogen phosphate, potassium dihydrogen phosphate, disodium hydrogen phosphate, or dipotassium hydrogen phosphate.

A melt flow rate (MFR) (210° C., under a load of 2160 g, based on ASTM D1238) of the EVOH (C) is preferably from 0.1 to 100 g/10 min., and more preferably from 0.5 to 50 g/10 min.

In the resin composition of the present invention, the TPU (B) and the EVOH (C) have a mass ratio (B/C) of from 70/30 to 99/1. In a case that the mass ratio (B/C) is less than 70/30, the TPU (B) and the EVOH (C) are prone to be crosslinked and the melt shapability of a resin composition thereof is degraded. The mass ratio (B/C) is preferably 75/25 or more, and more preferably 80/20 or more. On the other hand, in a case that the mass ratio (B/C) exceeds 99/1, the problem of degrading the melt shapability is less likely to be arisen even without blending the TPU (A), and thus there is a little advantage of employing the resin composition of the present invention. The mass ratio (B/C) is preferably 98/2 or less, and more preferably 95/5 or less.

In the resin composition of the present invention, a content of the TPU (A), based on 100 parts by mass of a total of the TPU (B) and the EVOH (C), is from 1 to 30 parts by mass. In a case that the content of the TPU (A) is less than 1 part by mass, the effect of preventing a decrease in the melt viscosity of the resin composition thus obtained is insufficient. The content of the TPU (A) is preferably 2 parts by mass or more. In contrast, in a case that the content of the TPU (A) exceeds 30 parts by mass, the melt viscosity of the resin composition thus obtained becomes too high and it becomes difficult to be melt molded. The content of the TPU (A) is preferably 20 parts by mass or less.

A method of producing a resin composition of the present invention may be a method of melt kneading the TPU (A), the TPU (B), and the EVOH (C), and it is not limited in particular. It is possible to employ a known method of kneading, such as an extruder and a Brabender. The resin composition obtained by melt kneading may be shaped directly, and it is also allowed to be produced once into pellets and then shaped with another shaping machine.

It is preferred that the resin composition of the present invention is produced by using scraps of a multilayered structure as a raw material. That is, a preferable method of producing a resin composition of the present invention is a method of melt kneading by blending the TPU (A) with scraps obtained from a multilayered structure including at least one layer of the TPU (B) and at least one layer of the EVOH (C). The resin composition of the present invention has good melt shapability even with those obtained by using scraps as a raw material, so that reuse of scraps becomes easy and it is preferred from the perspective of resource saving. As such a scrap, it is possible to use edges of a multilayered film produced by coextrusion molding, by-product trimmed chips when producing by coextrusion blow molding, burrs when thermoforming, and further waste products due to poor shaping. The scraps are cut in appropriate dimensions, dried as needed, and then mixed with the TPU (A).

The method of shaping a resin composition of the present invention is not limited in particular, and various methods of melt molding are employed, such as extrusion molding and injection molding.

Shaped articles obtained by shaping the resin composition of the present invention is not limited in particular, and although it is allowed to be a shaped article only including the resin composition, it is preferred to be a multilayered structure having a layer of the resin composition. A preferred embodiment is a multilayered structure, including: at least one layer of the resin composition according to the present invention; at least one layer of the TPU (B); and at least one layer of the EVOH (C). When B denotes a layer of the TPU (B), C denotes a layer of the EVOH (C), and R denotes a layer of the resin composition according to the present invention, examples of the layer structure are R/B/C/B/R, R/B/C/B, B/R/C/R/B, B/R/C/B, and the like. A TPU (B) layer and an EVOH (C) layer can be adhered to each other even without via an adhesive resin, and a layer of the resin composition according to the present invention can also be adhered to both of them even without via an adhesive resin. It is preferred that a layer of the resin composition according to the present invention is the layer of the resin composition produced by using a scrap of a multilayered structure as a raw material.

A method of shaping a multilayered structure having a layer of the resin composition of the present invention is not limited in particular, and although coextrusion molding, coinjection molding, or the like is employed, coextrusion molding is preferred from the perspectives of easy production, economy, and the like. The coextrusion molding may include coextrusion sheet molding, coextrusion inflation molding, coextrusion blow molding, and coextrusion lamination. In a case of shaping by coextrusion molding or coinjection molding, it is desired that the resins forming respective layers have comparable melt viscosities. In a case that the resins forming respective layers have largely different melt viscosities, it causes generation of film surface roughness and holes. Accordingly, it is important to decrease a difference of the melt viscosities between the resin composition and the TPU (B) in the multilayered structure.

A sheet, a film, parisons, or the like of a multilayered structure thus obtained can also be reheated to obtain a stretched shaped article by stretching uniaxially or biaxially. Examples of a shaping method in that case are thermoforming, roll stretching, pantograph stretching, inflation stretching, blow molding, and the like.

Shaped articles thus obtained are used in various applications in which a gas barrier property, flexibility, and the like are required.

EXAMPLES

The present invention is described more specifically below by way of Examples.

(1) Synthesis of TPU (A)

As raw materials, two types of polyester polyol, a diisocyanate, and a chain extender listed below were used.

Polyester Polyol (1)

A polyester diol produced by reacting 1,4-butanediol and adipic acid, having a hydroxyl number per molecule of 2.00, and having a number average molecular weight of 1000

Polyester Polyol (2)

A polyester polyol produced by reacting 3-methyl-1,5-pentanediol, trimethylolpropane, and adipic acid, having a hydroxyl number per molecule of 3.00, and having a number average molecular weight of 1000

Diisocyanate 4,4'-diphenylmethane diisocyanate (hereinafter, may be abbreviated as MDI)

Chain Extender 1,4-butanediol (hereinafter, may be abbreviated as BD)

As the polyester polyol, a 98/2 (molar ratio) mixture of the polyester polyol (1) and the polyester polyol (2) above mentioned was used. The mixture had a hydroxyl number per molecule of 2.02. The mixture, the MDI, and the BD were mixed so as to make the charge ratio to be the values shown as Synthesis Examples 1 through 4 in Table 1, and then continuously melt kneaded using a multi-shaft screw extruder (25 mmφ, cylinder temperature of from 180 to 200° C., die temperature of 200° C.) Thus, pellets of TPUs (A-1) through (A-4) were obtained. The TPUs (A-1) through (A-4) thus obtained all had a logarithmic viscosity of 1.20 dl/g (measured in an N,N-dimethylformamide solvent, at a concentration of 0.5 g/dl, at 30° C.). Regarding the pellets thus obtained, the melt flow rates were measured in conditions of 200° C. and a load of 2160 g based on ASTM D1238, and the respective results were 1.6 g/10 min., 2.0 g/10 min., 2.1 g/10 min., and 1.6 g/10 min. Synthesis Examples for the TPUs (A-1) through (A-4) are shown in Table 1.

(2) Synthesis of TPU (B)

A mixture of 61.78 mass % of the polyester polyol (1), 32.21 mass % of the MDI, and 6.02 mass % of the BD was continuously melt kneaded using a multi-shaft screw extruder (25 mmφ, cylinder temperature of from 180 to 200° C., die temperature of 200° C.) to obtain pellets of TPU (B-1). The TPU (B-1) thus obtained had a logarithmic viscosity of 1.15 dl/g (measured in an N,N-dimethylformamide solvent, at a concentration of 0.5 g/dl, at 30° C.). Regarding the sample thus obtained, the melt flow rate was measured in conditions of 200° C. and a load of 2160 g based on ASTM D1238, and the result was 1.6 g/10 min. Synthesis Example for the TPU (B-1) is shown in Table 1.

TABLE 1

| | TPU | MDI Mass % | POH Mass % | BD Mass % | PIa Molar Ratio *1) | POHa Molar Ratio *1) | CLa Molar Ratio *1) | PIa/ (POHa + CLa) |
|---|---|---|---|---|---|---|---|---|
| Synthesis Example 1 | A-1 | 32.35 | 62.05 | 5.60 | 0.5090 | 0.2465 | 0.2445 | 1.037 |

TABLE 1-continued

|  | TPU | MDI Mass % | POH Mass % | BD Mass % | PIa Molar Ratio *1) | POHa Molar Ratio *1) | CLa Molar Ratio *1) | PIa/ (POHa + CLa) |
|---|---|---|---|---|---|---|---|---|
| Synthesis Example 2 | A-2 | 32.45 | 62.25 | 5.30 | 0.5160 | 0.2499 | 0.2340 | 1.067 |
| Synthesis Example 3 | A-3 | 32.56 | 62.45 | 4.99 | 0.5236 | 0.2536 | 0.2227 | 1.100 |
| Synthesis Example 4 | A-4 | 32.21 | 61.78 | 6.02 | 0.4992 | 0.2418 | 0.2590 | 0.997 |
| Synthesis Example 5 | B-1 | 32.21 | 61.78 | 6.02 | 0.5004 | 0.2400 | 0.2596 | 1.002 |

MDI: 4,4'-diphenylmethane diisocyanate
POH: High molecular weight polyol
BD: 1,4-butanediol
*1) Molar ratio when PIa + POHa + CLa = 1

(3) EVOH (C)

EVOH pellets "EVAL(registered trademark) E105B" (ethylene content of 44 mol %, degree of saponification of 99.9 mol %, MFR 8.0 g/10 min. at 200° C. under a load of 2160 g) produced by Kuraray Co., Ltd. were used. Hereinafter, it is referred to as EVOH (C-1).

Example 1

Melt Kneading Test

The TPU (B-1) and the EVOH (C-1) were mixed in a state of pellets at a mass ratio of 95:5 and charged into a Brabender (manufactured by Toyo Seiki Seisaku-sho, Ltd.) set at 210° C. to be kneaded for five minutes, and then 10 parts by mass of the TPU (A-1) was added based on 100 parts by mass of a total of the TPU (B-1) and the EVOH (C-1). It was melt kneaded for five minutes and then stopped kneading to take a sample of the resin composition. Regarding the sample thus obtained, the melt flow rate was measured in conditions of 200° C. and a load of 2160 g based on ASTM D1238, and the result was 1.5 g/10 min. The results are shown altogether in Table 2.

[Film Forming Test]

The TPU (B-1) and the EVOH (C-1) were mixed in a state of pellets at a mass ratio of 95:5 and charged into a twin screw extruder (screw diameter of 25 mm, cylinder temperature of 210° C.) manufactured by Toyo Seiki Seisaku-sho, Ltd. and melt kneaded to obtain pellets of the resin composition. Based on 100 parts by mass of the pellets of the resin composition thus obtained, 10 parts by mass of pellets of the TPU (A-1) were added and charged into a single screw extruder manufactured by Toyo Seiki Seisaku-sho, Ltd. to fabricate a film having a thickness of 100 μm using a coat-hanger die (width of 30 mm, die temperature of 210° C.). During the film forming process for 30 minutes, holes and the like were not observed in the film and thus the single layer film formability was good and determined as "A". The results are shown in Table 2. The single layer film formability was determined as "A" in a case that defects, such as holes, were not observed in the film and that a uniform film was obtained during the film formation for 30 minutes, and as "B" in a case that defects, such as holes, were generated in the film and film formation became impossible.

Examples 2 Through 9

Comparative Examples 1 Through 3

In a same manner as Example 1 other than modifying the mass ratio of the TPU (B) and the EVOH (C) and the type and the blending amount of the TPU (A) as shown in Table 2, melt kneading tests and film forming tests were carried out. The results are shown in Table 2.

TABLE 2

|  | TPU (B)/ EVOH (C) Mass Ratio | TPU (A) Type | Blending Amount Parts by Mass *1) | MFR after Melt Kneading Test (g/10 min) | Single Layer Film Formability |
|---|---|---|---|---|---|
| Example 1 | 95/5 | A-1 | 10 | 1.5 | A |
| Example 2 | 95/5 | A-2 | 10 | 1.2 | A |
| Example 3 | 95/5 | A-3 | 10 | 0.6 | A |
| Example 4 | 95/5 | A-1 | 20 | 1.1 | A |
| Example 5 | 95/5 | A-2 | 20 | 1.0 | A |
| Example 6 | 95/5 | A-3 | 20 | 0.4 | A |
| Example 7 | 98/2 | A-1 | 10 | 1.9 | A |
| Example 8 | 90/10 | A-1 | 10 | 1.1 | A |
| Example 9 | 80/20 | A-1 | 10 | 0.9 | A |
| Comparative Example 1 | 95/5 | — | 0 | 2.5 | B |
| Comparative Example 2 | 95/5 | A-4 | 10 | 2.2 | B |
| Comparative Example 3 | 95/5 | A-1 | 40 | 0.01 | B |

*1) Blending amount based on 100 parts by mass of a total of the TPU (B) and the EVOH (C).

Example 10

The TPU (B-1) and the EVOH (C-1) were mixed in a state of pellets at a mass ratio of 95:5 and charged into a twin screw extruder (screw diameter of 25 mm, cylinder temperature of 210° C.) manufactured by Toyo Seiki Seisaku-sho, Ltd. and melt kneaded to obtain pellets of the resin composition. Based on 100 parts by mass of the pellets of the resin composition thus obtained, 10 parts by mass of the pellets of the TPU (A-1) were added and mixed in a state of pellets, and they were charged into a twin screw extruder (screw diameter of 25 mm, cylinder temperature of 210° C.) manufactured by Toyo Seiki Seisaku-sho, Ltd. and melt kneaded to obtain pellets of a resin composition (R-1).

Using the resin composition (R-1) thus obtained, the TPU (B-1), and the EVOH (C-1), a five-layer sheet (R-1/B-1/C-1/B-1/R-1) was fabricated in the coextrusion molding conditions below with a three-type five-layer coextruder. The five-layer sheet thus obtained had no surface roughness and no irregularity of thickness was found in each layer. The evaluation results are shown in Table 3. In the multilayered sheet thus obtained, a case of no roughness on the surface and no irregularity of thickness found in each layer was defined as A, a case of obtaining a multilayered sheet while surface roughness and irregularity of thickness were found was defined as B, and a case of no multilayered sheet obtained due to surface roughness or holes was defined as C.

The coextrusion molding conditions were as below.

Layer structure: R-1/B-1/C-1/B-1/R-1
(Thickness: 400/95/10/95/400: Units in μm)
Extrusion Temperature of Each Resin:
C1/C2/C3/Die=170/170/220/200° C.
Extruder Specifications of Each Resin:
TPU (B-1):
25 mmφ extruder, P25-18AC (manufactured by Osaka Seiki Kosaku K.K.)
EVOH (C-1):
20 mmφ extruder, a laboratory machine of ME type CO-EXT (manufactured by Toyo Seiki Seisaku-sho, Ltd.)
Resin composition (R-1):
40 mmφ extruder GT-40A (manufactured by Research Laboratory of Plastics Technology Co., Ltd.)
T die specifications:
For 500 mm width, three-type five-layer (manufactured by Research Laboratory of Plastics Technology Co., Ltd.)
Temperature of cooling roller: 40° C.
Draw rate: 1 m/min.

Examples 11, 12

Comparative Examples 4 Through 6

In a same manner as Example 10 other than modifying the TPU (A) to be blended when melt kneading into the type and the amount shown in Table 3, five-layer sheets were produced for evaluation. The results of film formation of the five-layer sheets are shown in Table 3.

TABLE 3

| | TPU (B)/ EVOH (C) Mass Ratio | TPU (A) Type | TPU (A) Blending Amount Parts by Mass *1) | Multilayered Film Formability |
|---|---|---|---|---|
| Example 10 | 95/5 | A-1 | 10 | A |
| Example 11 | 95/5 | A-2 | 10 | A |
| Example 12 | 95/5 | A-3 | 10 | A |
| Comparative Example 4 | 95/5 | — | 0 | C |
| Comparative Example 5 | 95/5 | A-4 | 10 | B |
| Comparative Example 6 | 95/5 | A-1 | 40 | C |

*1) Blending amount based on 100 parts by mass of a total of the TPU (B) and the EVOH (C)

The invention claimed is:

1. A resin composition, comprising:
(A) a thermoplastic polyurethane (A), which is a thermoplastic polyurethane obtained by reacting a polyisocyanate, a high molecular weight polyol, and a chain extender, and is a thermoplastic polyurethane in which the high molecular weight polyol comprises polyester polyol or polyether polyol having a number average molecular weight of from 500 to 8000 and the chain extender comprises a low molecular weight polyol having a molecular weight of 300 or less, and satisfies expression (1)

$$1.02 \leq PIa/(POHa+CLa) \leq 1.12 \quad (1)$$

wherein PIa is content (mole) of isocyanate groups in the polyisocyanate,
wherein POHa is content (mole) of hydroxyl groups in the high molecular weight polyol, and
wherein CLa: content (mole) of hydroxyl groups in the chain extender;
(B) a thermoplastic polyurethane (B), which is a thermoplastic polyurethane obtained by reacting a polyisocyanate, a high molecular weight polyol, and a chain extender, and is a thermoplastic polyurethane in which the high molecular weight polyol comprises polyester polyol or polyether polyol having a number average molecular weight of from 500 to 8000 and the chain extender comprises a low molecular weight polyol having a molecular weight of 300 or less, and satisfies expression (2)

$$PIb/(POHb+CLb) < 1.02 \quad (2),$$

wherein PIb is content (mole) of isocyanate groups in the polyisocyanate
wherein POHb is content (mole) of hydroxyl groups in the high molecular weight polyol
wherein CLb is content (mole) of hydroxyl groups in the chain extender;
(C) a ethylene-vinyl alcohol copolymer (C), which is an ethylene-vinyl alcohol copolymer comprising ethylene in a content of from 20 to 60 mol % and having a degree of saponification of 90 mol % or more,
wherein the thermoplastic polyurethane (B) and the ethylene-vinyl alcohol copolymer (C) have a mass ratio (B/C) of from 70/30 to 99/1, and
wherein a content of the thermoplastic polyurethane (A), based on 100 parts by mass of a total of the thermoplastic polyurethane (B) and the ethylene-vinyl alcohol copolymer (C), is from 1 to 30 parts by mass.

2. The composition of claim 1, wherein the thermoplastic polyurethane (B) has a JIS A hardness of from 80 to 95.

3. A method of producing the composition of claim 1, the method comprising:
melt kneading by blending the thermoplastic polyurethane (A) with a scrap obtained from a multilayered structure comprising at least one layer of the thermoplastic polyurethane (B) and at least one layer of the ethylene-vinyl alcohol copolymer (C).

4. A multilayered structure, comprising:
at least one layer of the composition of claim 1;
at least one layer of the thermoplastic polyurethane (B); and
at least one layer of the ethylene-vinyl alcohol copolymer (C).

5. A method of producing the composition of claim 2, the method comprising:
melt kneading by blending the thermoplastic polyurethane (A) with a scrap obtained from a multilayered structure comprising at least one layer of the thermoplastic polyurethane (B) and at least one layer of the ethylene-vinyl alcohol copolymer (C).

6. A multilayered structure, comprising:
at least one layer of the composition of claim 2;
at least one layer of the thermoplastic polyurethane (B); and
at least one layer of the ethylene-vinyl alcohol copolymer (C).

7. The composition of claim 1, wherein the polyisocyanate, from which the thermoplastic polyurethane (A) is obtained, comprises at least one aromatic diisocyanate.

8. The composition of claim 1, wherein the polyisocyanate, from which the thermoplastic polyurethane (A) is obtained, comprises at least one aliphatic diisocyanate.

9. The composition of claim 1, wherein the polyisocyanate, from which the thermoplastic polyurethane (A) is obtained, comprises at least one alicyclic diisocyanate.

10. The composition of claim 1, wherein the polyisocyanate, from which the thermoplastic polyurethane (A) is obtained, comprises at least one selected from the group consisting of 4,4'-diphenylmethane diisocyanate, tolylene diisocyanate, phenylene diisocyanate, xylylene diisocyanate, 1,5-naphthylene diisocyanate, 3,3'-dichloro-4,4'-diphenylmethane diisocyanate, toluylene diisocyanate, hexamethylene diisocyanate, isophorone diisocyanate, 4,4'-dicyclohexylmethane diisocyanate, and hydrogenated xylylene diisocyanate.

11. The composition of claim 1, wherein the polyisocyanate, from which the thermoplastic polyurethane (A) is obtained, comprises 4,4'-diphenylmethane diisocyanate.

12. The composition of claim 1, wherein the high molecular weight polyol, from which the thermoplastic polyurethane (A) is obtained, has a number average molecular weight within a range of 700 to 5,000.

13. The composition of claim 1, wherein the chain extender, from which the thermoplastic polyurethane (A) is obtained, comprises at least one aliphatic diol having a carbon number of from 2 to 10.

14. The composition of claim 1, wherein the chain extender, from which the thermoplastic polyurethane (A) is obtained, comprises at least one selected from the group consisting of ethylene glycol, propylene glycol, 1,4-butanediol, 1,6-hexanediol, 1,4-bis($\beta$-hydroxyethoxy)benzene, 1,4-cyclohexanediol, bis($\beta$-hydroxyethyl)terephthalate, and xylylene glycol.

15. The composition of claim 1, wherein the chain extender, from which the thermoplastic polyurethane (A) is obtained, comprises 1,4-butanediol.

16. The composition of claim 1, wherein the thermoplastic polyurethane (A) has a ratio [PIa/(POHa+CLa)] of 1.03 or more.

17. The composition of claim 1, wherein the thermoplastic polyurethane (A) has a ratio [PIa/(POHa+CLa)] of 1.04 or more.

18. The composition of claim 1, wherein the thermoplastic polyurethane (A) has a ratio [PIa/(POHa+CLa)] of 1.10 or less.

19. The composition of claim 1, wherein the thermoplastic polyurethane (A) has a ratio [PIa/(POHa+CLa)] of 1.08 or less.

20. The composition of claim 1, wherein the thermoplastic polyurethane (B) has a JIS A hardness of from 85 to 95.

* * * * *